(12) United States Patent
Gauss et al.

(10) Patent No.: US 7,322,560 B2
(45) Date of Patent: Jan. 29, 2008

(54) COAXIAL VALVE

(75) Inventors: Adolf Gauss, Koenigsbrunn (DE);
Arno Voit, Hausham (DE)

(73) Assignee: EADS Space Transportation GmbH, Bremen (DE)

( * ) Notice: Subject to any disclaimer, the term of this patent is extended or adjusted under 35 U.S.C. 154(b) by 42 days.

(21) Appl. No.: 11/471,649

(22) Filed: Jun. 21, 2006

(65) Prior Publication Data
US 2007/0007476 A1    Jan. 11, 2007

(30) Foreign Application Priority Data
Jun. 21, 2005   (DE)  ...................... 10 2005 028 584

(51) Int. Cl.
*F16K 31/04* (2006.01)
(52) U.S. Cl. .................. 251/129.11; 251/248
(58) Field of Classification Search .......... 251/129.11, 251/129.12, 129.13, 248; 475/5
See application file for complete search history.

(56) References Cited

U.S. PATENT DOCUMENTS

| | | | |
|---|---|---|---|
| 2,089,736 A * | 8/1937 | Edwards ................... | 251/335.3 |
| 2,784,600 A * | 3/1957 | Hammond ................... | 251/250 |
| 3,161,074 A | 12/1964 | Korthaus et al. | |
| 4,760,989 A * | 8/1988 | Elliott et al. ........... | 251/129.12 |
| 4,780,785 A * | 10/1988 | Schabert et al. ....... | 251/129.13 |
| 4,948,091 A | 8/1990 | Satoh et al. | |
| 6,802,488 B1 | 10/2004 | Patterson | |
| 6,840,200 B2 | 1/2005 | Miller | |

FOREIGN PATENT DOCUMENTS

| | | |
|---|---|---|
| DE | 1190759 | 4/1965 |
| DE | 690 10 349 T2 | 1/1995 |
| DE | 199 60 330 A1 | 7/2001 |
| DE | 19960330 C2 | 8/2003 |
| EP | 0 383 353 A2 | 8/1990 |
| EP | 1 371 885 A2 | 12/2003 |

OTHER PUBLICATIONS

European Search Report dated Sep. 26, 2006 with an English translation of the pertinent portion (four (4) pages).
German Office Action dated Jun. 13, 2006 with English translation (Eleven (11) pages).

* cited by examiner

*Primary Examiner*—John Bastianelli
(74) *Attorney, Agent, or Firm*—Crowell & Moring LLP

(57) ABSTRACT

A coaxial valve includes a valve box having an inlet opening, an outlet opening, and a common flow channel. An axially movable cylindrical valve casing has an opening for a fluid inlet port and an opening for a fluid outlet port, both of which are joined up in the flow channel. A coaxially positioned shutoff mechanism located inside the valve box closes off the inlet port or the outlet port of the valve casing. To provide for axial movement, the valve casing has at least one external circular groove. The drive casing has at least one inner circular groove, which is adapted to the outer circular groove so that the inner and outer grooves are engaged, via inside ball bearings, to create a ball planetary gear and ball rotary spindle drive. The drive casing is turnable and forced to turn by a drive motor inside of the valve box.

20 Claims, 3 Drawing Sheets

COAXIAL VALVE

This application claims the priority of German application 10 2005 028 584.8, filed Jun. 21, 2005, the disclosure of which is expressly incorporated by reference herein.

BACKGROUND AND SUMMARY OF THE INVENTION

This invention pertains to a coaxial valve including a valve box, having at least one fluid inlet opening, at least one fluid outlet opening, and a common flow channel connecting the fluid inlet and fluid outlet openings together. A tubular shaped valve casing, which is prevented from turning but permitted to be axially pivotable, features a fluid inlet port and an outlet port, which join inside the common flow channel. A shutoff mechanism, located inside of the valve box, is coaxial to the valve casing and designed to shut off the fluid inlet port or the outlet port of the valve casing, and a drive is provided to produce axial movement of the valve casing. The valve may be used with cryogenic fluids.

Special requirements must be met with valves that serve for the regulating and sealing off of a liquid or gaseous medium under extreme conditions, such as chemical aggressiveness, very high or very low temperatures, or very high pressure. Fields of application for valves that serve to seal off a fluid or gaseous medium are found in power trains in air and space travel. These valves are exposed to extreme temperatures and extreme temperature changes. For valves used for fluid and gaseous rocket fuels, there are additional parameters which increase certain demands on this type of valve, such as demands relating to mass flow, high pressure, and short switching time for opening and closing of the valve or for getting the valve into a special position.

A valve with these specifications is known from German document DE 199 60 330 C2. The valve shaft of this valve is moved axially in relation to the valve closing mechanism within the flow by a lever which is activated by an electric servo motor from the outside of the valve body.

Since this servo motor is mounted externally, this valve has relatively large mounting dimensions. In addition, operation using a lever mechanism is complicated and therefore presents increased risks for malfunctioning to an extent which is unacceptable in applications in space aviation.

It is one object of this invention to design a valve with these specifications which is extremely reliable in its operation because of its compact construction, low friction, low energy requirements, and light weight.

This object is achieved by way of a valve in which the valve casing is provided, at least in sections, with at least one threaded external nut at an outer circular groove, in which the valve casing is enclosed by a coaxial drive casing at a location of the outer circular groove, in which the drive casing is provided with at least one threaded inner circular groove adapted to the outer circular groove so that ball bearings running along the inner and outer circular grooves create tension against one another, thus forming a ball planetary gear of a ball rotary spindle drive, and in which the drive casing is located inside of the valve box, is pivotable but firmly seated axially, and is made to pivot by a drive motor inside of the valve box.

The valve shaft is therefore equipped, section by section, on its outer surface with at least one external adjusting nut with threads and surrounded in each section of this external adjusting nut by a drive sleeve which is coaxial to the valve shaft. The drive sleeve is equipped on its interior with at least one threaded internal adjusting nut, which fits against the outer adjusting nut in such a way that the inner and outer threads match and thus perform the ball screw-driven propulsion of a linear integrated ball screw drive. The drive shaft can turn within the valve casing but is axially secured and rotated by a driving motor installed on the inside of the valve shaft. The driving motor and the driving shaft actuate the drive for the valve shaft by taking into consideration the section of the threaded outer nut and the bearings which are integrated into the valve shaft.

The valve shaft is thus identical with the spindle of the screw-driven propulsion. The advantage of the construction described is the compact structure of this coaxial valve which is achieved by the integration of the valve shaft with the screw driven propulsion, and the resulting light weight.

Further advantages of this invention will also be apparent.

It is especially of advantage when the drive casing is surrounded by the rotor of the drive shaft and is connected to prevent any rotation. Configuring the motor coaxially with the valve shaft provides for a particularly compact construction of the coaxial valve. It is advantageous that the rotor is surrounded by a stator from the driving motor and that the stator is prevented from turning within the valve casing.

It is also beneficial when the stator's position allows for at least a certain amount of axial shifting because this design will compensate for thermal expansion of the various elements of the drive.

In another advantageous design the rotor can turn inside the stator by means of at least two radial roller bearings. The provision of this roller bearing ensures that the space between the rotor and the stator remains constant during operation, especially under temperature fluctuations.

An electrically driven driving motor presents an advantage. It is also conceivable that, for example, a hydraulic driving motor could be used.

In another advantageous embodiment, the drive shaft is positioned above two axial roller bearings. This placement promotes the attachment of the drive shaft within the valve casing and thus ensures a definite axial positioning of the ball screw driven propulsion.

Optimally, the two axial roller bearings are each provided with a circular, domed convex outer surface within their respective outer bearing rings. These convex outer surfaces are supported in turn by a corresponding concave inner surface on the interior of the valve casing where the respective spherical and concave and convex surfaces share the same central point on the axis of the valve casing. With this design, the entire drive system, including the ball screw propulsion, is at least to some degree pivotable in all directions around the central point, so that tensions caused in the drive, especially by temperature fluctuations, are counter-balanced in the casing and/or in the drive. As a result, a secure valve seal is guaranteed, and an abrasion-free operation of the valve shaft is enabled even in the presence of tension within the valve casing and/or in the drive.

These features are improved, in an enhanced modification of the invention, by providing the closing mechanism with a first part which has a domed concave surface pointing toward the valve shaft, and by having a domed convex surface of a second part which can be pivoted in such a way that these two parts are connected in an axial direction, but can move relative to each other along the domed surfaces, while the central point of the domed surfaces of the closing mechanism is aligned with the central point of the two domed axial roller bearings. In this way, the second part of the closing mechanism with a tight seal is positioned in a way that allows for pivoting around the same central point, thereby further improving the reliability of the seal even where there is tension within the valve casing and/or in the drive.

In a preferred embodiment, the closing mechanism is equipped on the second part with a valve seat which, together with the front-sided rim around the valve port of the neighboring end of the valve shaft, effects an even better seal when the valve is closed.

The invention will now be described by way of an example shown in the drawings.

BRIEF DESCRIPTION OF THE DRAWING FIGURES

DETAILED DESCRIPTION OF THE INVENTION

Figure 1:
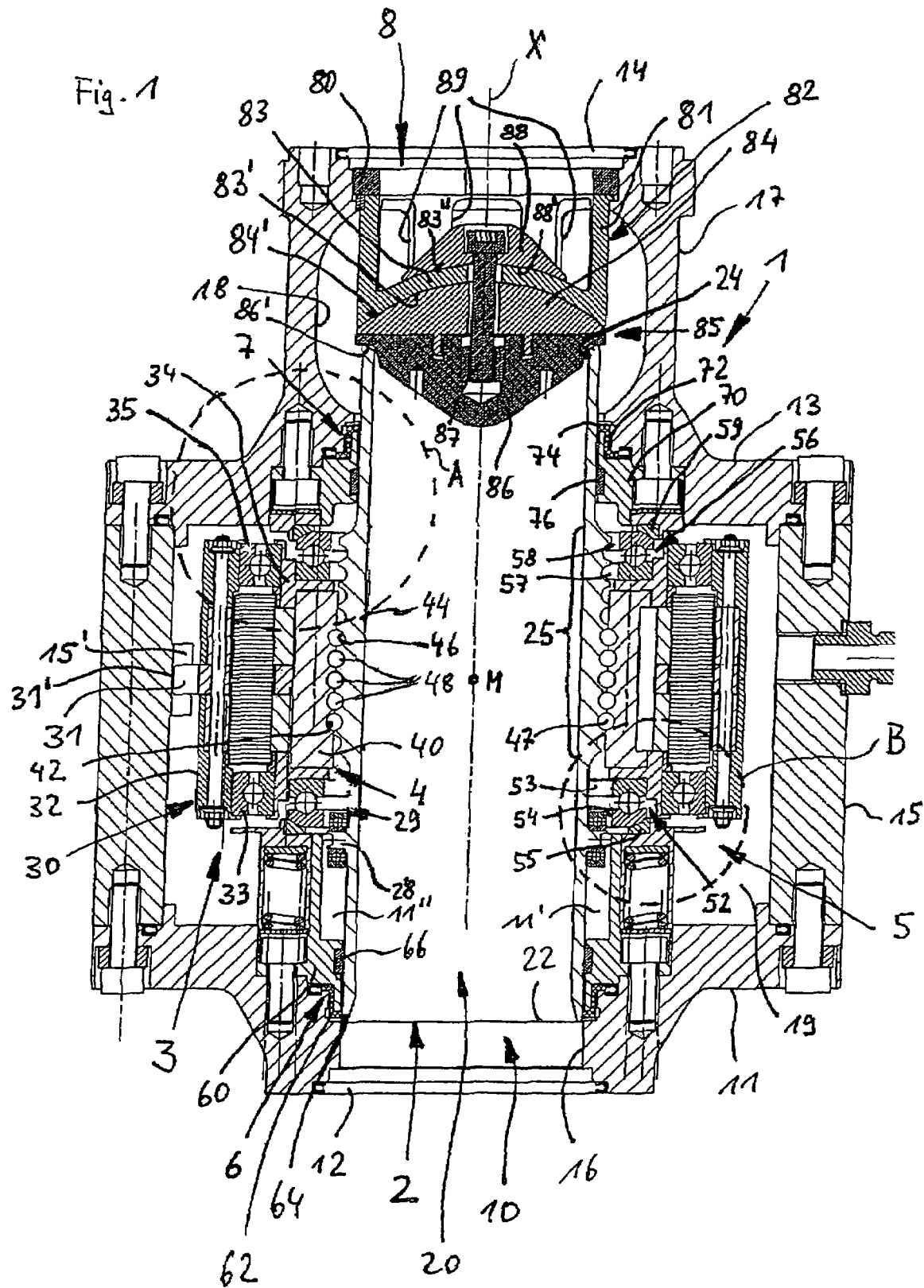
FIG. 1 shows a cross-section of a coaxial valve according to the invention.

FIG. 1 shows a cross-section of a coaxial valve. In the valve box 1, a flow channel 10 with a fluid inlet opening 12 and a fluid outlet opening 14 is provided. The fluid inlet opening 12 and the fluid outlet opening 14 on opposite ends of the valve box 1 are constructed in such a way that the flow channel 10 from the fluid inlet opening 12 is level with the fluid outlet opening 14. In the cross-sectional view, flow channel 10, the fluid inlet opening 12 and the fluid outlet opening 14 are arranged in a circular fashion and coaxially to each other, whereby they share a common center line X. In the area of the fluid inlet opening 12, the flow channel 10 is formed by a first cylindrical bore section 16. The first cylindrical bore section 16 is provided with a first frontal lid section 11 of valve box 1. The fluid outlet opening 14 is provided with a second frontal lid section 13 on the side opposing the first frontal lid section of the valve casing. A cylindrical mid section 15 is situated between the first frontal lid section 11 and the second frontal lid section 13 of the valve box 1. Both lid sections 11,13 are screwed together with the cylindrical mid section, as illustrated in FIG. 1.

The second frontal lid section 13 shows a cylindrical casing connection 17 protruding forward in the direction of the center line X which has been provided with a fluid outlet opening 14. On the inside of the cylindrical casing connection 17, a basically cylindrical second bore section 18 of the flow channel 10 is built, whereby this bore section possesses a diameter which is greater than that of the first cylindrical bore section 16. Between the first cylindrical bore section 16 and the second basically cylindrical bore section 18 of the flow channel 10, a cylindrical internal space 19 is located in the area of the mid section 15 of the valve box 1, the diameter of which is considerably larger than the diameter in the second basically cylindrical bore section 18.

In the flow channel 10 there is a tubular valve casing 2 coaxial to flow channel 10 between the first cylindrical bore section 16 and the second basically cylindrical bore section 18. The valve casing 2 is made circular in cross-section and free to travel along its axis, which is identical with the center line X. The valve casing 2 is constructed as a straight tube and surrounds an inner channel 20, which is provided with a front-sided inlet port 22 next to inlet opening 12 and a front-sided outlet port 24, which faces toward fluid outlet opening 14. Thus the inner channel 20 provides a central section of flow channel 10 between the first cylindrical bore section 16 and the second basically cylindrical bore section 18.

On the internal space 19, a drive 3 is provided. The drive acts on the valve casing 2 to move toward the center line X and will be further described hereafter.

The drive 3 surrounds a drive motor 30, which is arranged inside the internal space 19, is constructed as an electric motor, and surrounds valve casing 2, and a ball planetary gear 4 which couples the drive of the motor 30 and the valve casing 2. The motor 30 and the ball planetary gear 4 are also arranged coaxially around the valve casing 2, so that the rotation axis of the motor 30 and the ball planetary gear 4 align with the center line X under normal circumstances when no deformation of the valve casing 2, caused by mechanical tension, has taken place.

The motor 30 is constructed as an internal rotor motor and has an external radial stator 32 as well as an internal radial rotor 34. The stator 32 is prevented from turning by means of at least one radial outward protruding nib 31 on a radially inward turned rib 15' of the cylindrical mid section 15, but can be axially displaced. This possibility for axial displacement facilitates a minimal relative movement in axial direction between the valve box 1 and the drive 3, thus avoiding tensions within drive 3 and in the valve box 1 on account of varying thermal expansion of drive 3 and valve box 1. For the same reason a nib 31' is allowed in addition between the radial outer edge of the nib 31 and the inner wall of the cylindrical mid section 15 which also facilitates a radial relative movement between the drive 3 and the valve box 1.

The stator 32 of the drive motor 30 is equipped with an electrical winding familiar to those skilled in the art. The rotor 34 inside the stator 32 is equipped with permanent magnets familiar to those skilled in the art around the outer surface. The rotor 34 is pivotable without friction by means of two radial ball bearings 33, 35 inside stator 32. This positioning of rotor 34 inside stator 32 by means of ball bearings 33, 35 ensures that a constant radial distance is maintained between rotor 34 and stator 32, even when extreme thermal influences have an effect on drive 3.

A cylindrical drive shaft 40 which is part of the ball planetary gear 4 has been provided inside the rotor 34. The shaft is also prevented from turning and is axially tightly connected with rotor 34. The drive shaft 40 is also arranged in coaxial order with the valve casing 2, and the middle axis of the drive shaft 40 is identical with the center line X of the valve casing 2.

The drive shaft 40 is provided with at least one threaded inner circular groove 42. The drive shaft 40 surrounds a central radial, outwardly tapering section 25 of the valve casing 2. This middle section 25 of the valve casing 2 forms an inner drive element 44, which is integrated with the valve casing 2 and which exhibits a threaded outer circular groove 46 on its exterior circumference which extends in axial direction across almost the entire length of the middle section 25 which is longer in axial direction than the section of the drive shaft 40, which is connected with the inner circular groove 42.

Between the radial outer circumference of the drive element 44 which has been constructed by the section 25 of the valve casing 2 and the inner circumference of the drive shaft there is only a very small space, so that the inner circular groove 42 and the outer circular groove 46 shown in the covering of the ball bearing channel 47 in FIG. 1 form a basically circular cross-section, which contains numerous balls 48. In this way, the inner drive element 44, the balls 48, and the drive casing 40 will form the ball planetary gear 4.

The drive 3 and the ball planetary gear 4 will create a ball rotary spindle drive 5 for the valve casing 2, which is integrated into the ball rotary spindle drive.

The valve casing 2 is constructed within the area of its flow inlet port 22 which has been inserted in the first frontal lid section 11 and has been sealed off with a slide ring gasket sealing washer 6. In the same way the valve casing 2 is constructed in the area of its opposite flow outlet port 24 and has been sealed off with a second slide ring gasket sealing washer 7 axially, whereby the second slide ring gasket sealing washer 7 is inserted in the second frontal lid section 13.

The first slide ring gasket sealing washer 6 consists of a first ring-shaped insert element 60, which surrounds the valve casing 2 and is equipped with a circular seal 62 with a sealing lip 64 fitted to the outer surface of the valve casing 2 and seals it. Axially inward from the sealing lip 64, turned away from the inlet port 22, that is, in the first insert element 60, there is a slide ring 66, which surrounds the outside of the valve casing 2 and turns this with minimal friction.

In an analogous fashion the second slide ring gasket sealing washer 7 shows a second insert element 70, which is tied to the second frontal lid section 13. The second insert element 70 is equipped with a ring-shaped seal 72 which has a radially inward turned sealing lip 74 and surrounds and seals the outer circumference. In the second insert element 70, axially inward from the sealing lip 74, turned away from the flow outlet port 24, there is an slide ring 76, which surrounds the valve casing 2 and turns it with absolutely minimal friction.

The ball rotary spindle drive 5, consisting of the drive motor 3 and the ball planetary gear 4 including the valve casing 2, is situated inside the valve box 1 and can be turned a little in all directions around the ball central point M, so that this ball central point M is positioned on the center line X, as outlined below. This positioning is achieved by means of two ball bearings 52, 56 coaxial to the center line X which have corresponding axial inner bearing ring 53, 57 and which have been installed on opposite front sides of the rotor 34. The corresponding bearing rings 54,58 of the axial ball bearings 52, 56 are supported by the first frontal lid section 11 and/or the second frontal lid section 13 in a way that will be described later on. In addition, there is a support ring 55 in place coaxially to the center line X and similarly on the second frontal lid section, a support ring 59 is located coaxially to the center line X.

Figure 2:
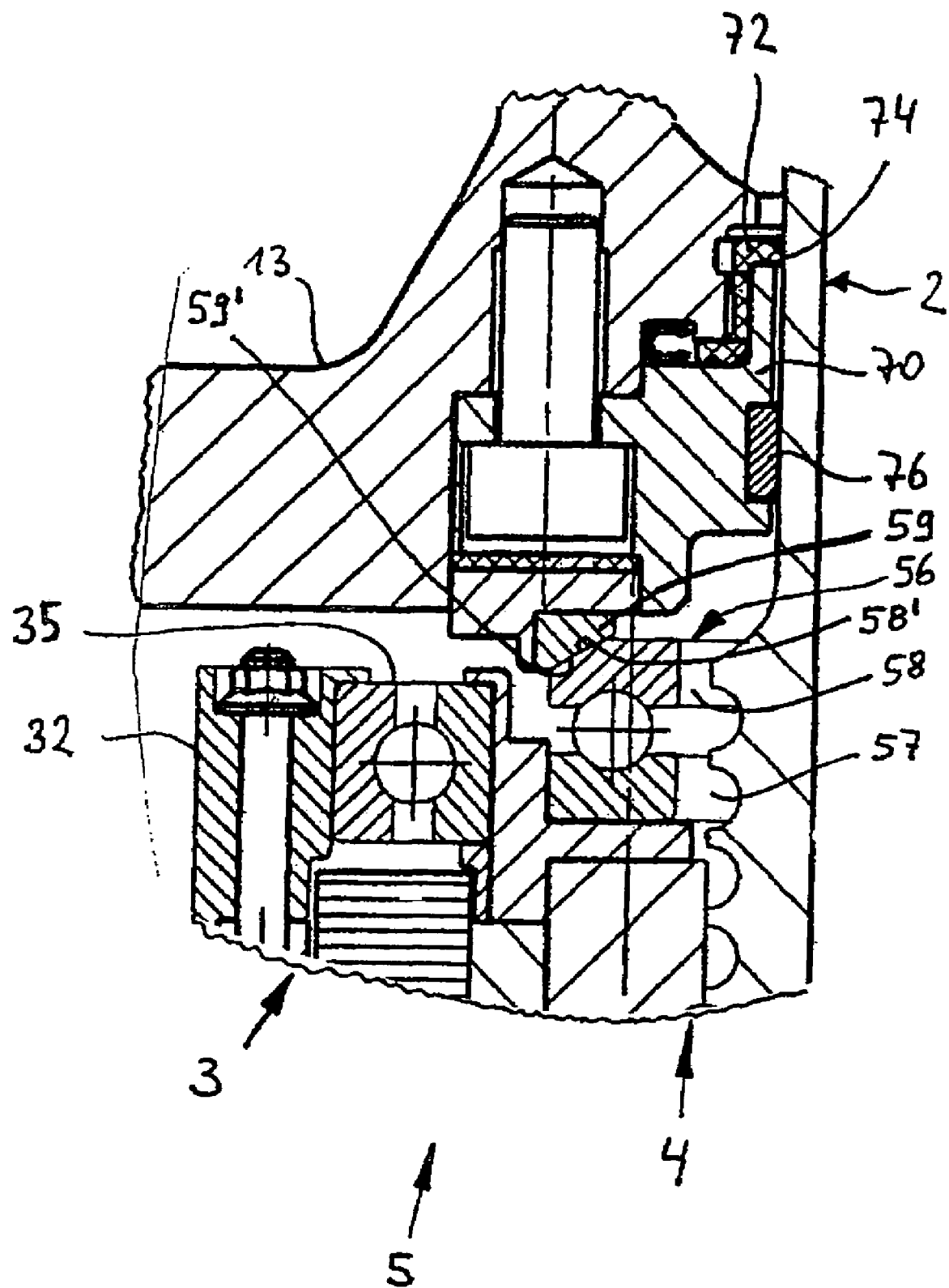
FIG. 2 is an enlarged view of a detail A of FIG. 1.

The positioning of the ball rotary spindle drive 5 inside the valve box 1, shown in detail A in FIG. 1, will now be described by means of FIG. 2. The description is given by reference to the upper axial ball bearing 56 in FIG. 1, while the support of the lower axial ball bearing 52 is achieved in the first frontal lid section 11 in the same way.

The support ring 59 is affixed to the second insert element 70, which is connected with the frontal lid section 13 in a manner familiar to those versed in the art. On its axially and radially inward side, the support ring 59 is equipped with a supporting spherical, concave inner surface 59' which has a corresponding ring-shaped, spherical, convex outer surface 58' which is found on the axial and radial outer area of the axial outer support ring 58 of the axial ball bearing 56. In the same way, the axially outer bearing ring 54 of the axial ball bearing 52 is equipped with a ring-shaped, spherical, convex outer surface 54, as is the support ring 55, which is affixed to the first insert element 60 of the first frontal lid section 11 with a spherical, concave inner surface 55', as shown in FIG. 3.

The convex surfaces 54' and 58' are ring-shaped segments of spheres in a virtual sphere with a central point M on the center line X. Even the concave surfaces 55' and 59' are ring-shaped spherical segments of a virtual sphere with the same central point M. In this manner the entire rotary spindle drive 5 can rotate a little around the center point M with relative movement between inner and outer surfaces 54" and 55", as well as surfaces 58" and 59".

Figure 3:
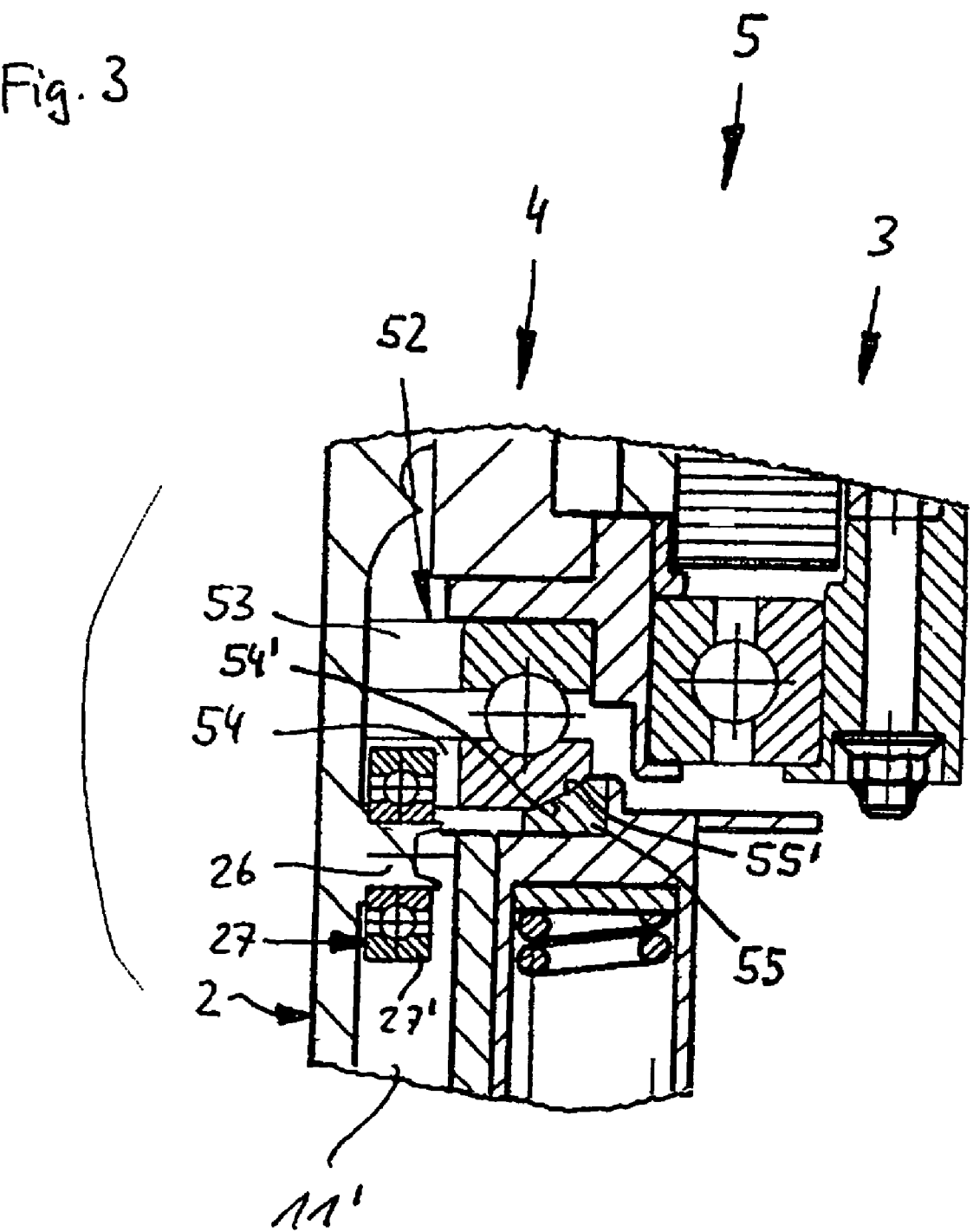
FIG. 3 is a enlarged view of a detail B of FIG. 1.

Furthermore, FIG. 3 shows that the valve casing 2 in the area of the first frontal cover section 11 is fitted with a pivot 26 projecting radially outwards, and a ball bearing 27 is connected to the pivot. Both the pivot 26 and the ball bearing 27 then catch a longitudinal slot 11" of the first frontal lid section 11 that runs parallel to the center line X, and the ball bearing 27, including its outer ring 27", will roll off a side wall of the longitudinal slot 11". In an analogous manner, on the valve casing 2 on the opposite side there is a pivot 28 projecting radially outwards. As shown in FIG. 1, a ball bearing 29 is connected to the pivot and will be steered in the same manner through a longitudinal slot 11" designated for this side of the first frontal lid section 11. Both these sideways guiding methods in the valve casing 2 will prevent the valve casing 2 from rotating relative to the valve box 1, and will assure that the valve casing 2—with the exception of a minimal swiveling action around the ball central point M—can only move in the direction of the center line X. Using ball bearings 27 and 29 as guide rollers will minimize any friction in the respective axial guide ways.

The second frontal lid section provides for a shutoff mechanism 8 inside the cylindrical casing connection 17, i.e. in the second mainly cylindrical bore section 18 of the flow channel 10. To open and close the valve, this shutoff mechanism will work in conjunction with the outlet port 24 of the valve casing 2. The shutoff mechanism 8 includes a ring-shaped base section 80 positioned coaxially to the center line X in the area of the fluid outlet opening 14 in the second frontal lid section 13. Connected to the ring-shaped base section 80 is a cylindrical tubular pedestal section 81 which is also positioned coaxially to the center line X. It forms the first part 82 of the shutoff mechanism 8 and extends into the mainly cylindrical bore connection 18 in the direction of the axial flow.

The cylindrical pedestal section 81 is provided in its perimeter wall with a majority of openings 89, which produce a fluid connection between the mainly cylindrical bore section 18 of the flow channel 10 and the fluid outlet opening 14.

The axial front wall 83 of the cylindrical pedestal section 81 pointing inwards into the valve box 1 is designed as a concave wall and is provided with a concave front surface 83", which is designed dome-shaped and constitutes a spherical segment of a virtual sphere with the central point M. An adapted convex outer surface 84" of a support element 84 for a valve unit 86 rests in the concave front surface 83". The support element 84 and the valve unit 86 together form a second part 85 of the shutoff mechanism 8. Also the support element 84 and the valve unit 86 are ordered co-axially to the central line X, whereby the convex outer surface 84" of the support element 84 likewise forms a dome-shaped spherical segment of a virtual ball with the central point M.

The valve unit 86 is ordered to the side of the support element 84 turned away from the convex outer surface 84" and points to the outlet port 24 of the valve casing 2. The valve unit 86 is designed conically, whereby in the area of its greatest perimeter it is provided with a circular step 86" forming a valve seat, which in sealing works together with the valve seat formed from the perimeter edge of the outlet port 24 of the valve casing 2 near the closed valve.

By means of a screw 87 centrally penetrating the concave front wall 83, which is braced against the front wall via a support element 88 provided on the back side of the concave front wall 83 of the cylindrical pedestal section 81, the valve unit 86 and the support element 84, and the first part 82 are braced against the second part 85 of the shutoff mechanism 8. The support element 88 is thereby provided with a concave front surface 88" pointing to the front wall 83, which forms a spherical sector of a virtual sphere with the central point M. The convex back surface 83" of the front wall 83, which is pointing towards the fluid outlet opening 14, is also part of a spherical surface with the central point M.

This shutoff mechanism 8 design, with its spherical surfaces showing the same central point M as the spherical surfaces of the ball rotary spindle drive 5 bearing inside the valve box, also allows the valve unit 86 to pivot a little around the center line M. Therefore, no significant uneven load will occur on the circular step 86" of the valve unit 86 which controls the valve location of the sealing element 8. That means, even in cases where there is a slight pivoting of the ball rotary spindle drive 5 and the valve unit 86, a dependable seal regarding the valve in the area of the valve unit 86 and the outlet port 24 is guaranteed. Furthermore, this way any external constraining forces will be kept away from the ball rotary spindle drive 5.

Any reference item numbers listed in any claims, descriptions, and drawings are solely provided to better understand the invention. They are in no way intended to limit the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The following is a list of Reference Items

| Reference Item No.: | |
|---|---|
| 1 | Valve Box |
| 2 | Valve Casing |
| 3 | Drive |
| 4 | Ball Planetary Gear |
| 5 | Ball Rotary Spindle Drive |
| 6 | First Slide Ring Gasket Sealing Washer |
| 7 | Second Slide Ring Gasket Sealing Washer |
| 8 | Shutoff Mechanism |
| 10 | Flow Channel |
| 11 | First Frontal Lid Section |
| 11' | Longitudinal Slot |
| 11" | Longitudinal Slot |
| 12 | Fluid Inlet Opening |
| 13 | Second Frontal Lid Section |
| 14 | Fluid Outlet Opening |
| 15 | Cylindrical Mid Section |
| 15' | Rib |
| 16 | First Cylindrical Bore Section |
| 17 | Cylindrical Casing Connection |
| 18 | Second Bore Section, Mainly Cylindrical |
| 19 | Internal Space |
| 20 | Inner Channel |
| 22 | Inlet Port |
| 24 | Outlet Port |
| 25 | Middle Section of 2 |
| 26 | Pivot |
| 27 | Ball Bearing |

-continued

| Reference Item No.: | |
|---|---|
| 27' | Outer Ring |
| 28 | Pivot |
| 29 | Ball Bearing |
| 30 | Drive Motor |
| 31 | Nib |
| 31' | Gap |
| 32 | Stator |
| 33 | Radial Ball Bearing |
| 34 | Rotor |
| 35 | Radial Ball Bearing |
| 40 | Drive Casing |
| 42 | Inner Circular Groove |
| 44 | Inner Drive Element |
| 46 | Outer Circular Groove |
| 47 | Ball Bearing Channel |
| 48 | Balls |
| 52 | Axial Ball Bearing |
| 53 | Axial Inner Support Ring |
| 54 | Axial Outer Support Ring |
| 54' | Convex Outer Surface |
| 55 | Support Ring |
| 55' | Concave Inner Surface |
| 56 | Axial Ball Bearing |
| 57 | Axial Inner Support Ring |
| 58 | Axial Outer Support Ring |
| 58' | Convex Outer Surface |
| 59 | Support Ring |
| 59' | Concave Inner Surface |
| 60 | First Insert Element |
| 62 | Circular Seal |
| 64 | Sealing Lip |
| 66 | Slide Ring |
| 70 | Second Insert Element |
| 72 | Ring-shaped Seal |
| 74 | Sealing Lip |
| 76 | Slide Ring |
| 80 | Ring-shaped Base Section |
| 81 | Cylindrical Tubular Pedestal Section |
| 82 | First Part of 8 |
| 83 | Front Wall |
| 83' | Concave Front Surface |
| 83" | Convex Back Surface |
| 84 | Support Element |
| 84' | Convex Outer Surface |
| 85 | Second Part of 8 |
| 86 | Valve Unit |
| 86' | Circular Step |
| 87 | Screw |
| 88 | Support Element |
| 88' | Concave Front Surface |
| 89 | Openings |
| X | Center Line |
| M | Ball Central Point |

We claim:

1. A coaxial valve comprising:

a valve box, having at least one fluid inlet opening, at least one fluid outlet opening, and a common flow channel connecting the fluid inlet and fluid outlet openings together, a tubular shaped valve casing, which is prevented from turning but permitted to be axially pivotable, featuring a fluid inlet port and an outlet port which join the common flow channel, a shutoff mechanism, located inside of the valve box, which is coaxial to the valve casing and designed to shut off the fluid inlet port or the outlet port of the valve casing, and a drive to produce axial movement of the valve casing, wherein the valve casing is provided, at least in sections, with at least one threaded external nut at an outer circular groove, wherein the valve casing is enclosed by a coaxial drive casing at a location of the outer circular groove, wherein the drive casing is provided with at least one threaded inner circular groove adapted to the outer circular groove so that ball bearings running along the inner and outer circular grooves create tension against one another, thus forming a ball planetary gear of a ball rotary spindle drive, and wherein the drive casing is located inside of the valve box, is pivotable but firmly seated axially, and is made to pivot by a drive motor inside of the valve box.

2. The coaxial valve in accordance with claim 1, wherein the drive casing is enclosed in a rotor of the drive motor and is prevented from turning.

3. The coaxial valve in accordance with claim 2, wherein the rotor is enclosed by a stator which is part of the drive motor, and wherein the stator is firmly seated and prevented from turning inside of the valve box.

4. The coaxial valve in accordance with claim 3, wherein the stator is axially pivotable within the valve housing.

5. The coaxial valve in accordance with claim 3, wherein the rotor is housed inside of the stator along with at least two radial anti-friction ball bearings, and is installed so as to be pivotable.

6. The coaxial valve in accordance with claim 1, wherein the drive motor is an electric motor.

7. The coaxial valve in accordance with claim 1, wherein the drive casing is installed on two axial bearings inside of the valve box.

8. The coaxial valve according to claim 7, wherein each of the two axial bearings, at respective axial outer support rings, is provided with a spherical, convex outer surface designed to correspond with an opposing concave inner surface for support inside of the valve box, and wherein the corresponding spherical concave and convex surfaces are also located at a center line of the valve box at a central axis of a ball central point.

9. The coaxial valve in accordance with claim 8, wherein the shutoff mechanism features a first part, which is provided with a circular, spherical concave surface pointing towards the valve casing in which one surface belonging to the first part of the shutoff mechanism is installed in such a manner that it is rotatable, so that both the first part and a second part are axially connected but can be moved alongside the surfaces relative to one another, and wherein, at the same time, the ball central point of the surfaces of the shutoff mechanism aligns with the ball central point of the shell-shaped surfaces and respective axial bearings.

10. The coaxial valve in accordance with claim 9, wherein the shutoff mechanism at its second part is provided with a circular step, which together with an adjacent edge of the valve casing, which is restricted by the front side of the rim of the outlet port, functions to create a seal when the valve is closed.

11. The coaxial valve in accordance with claim 7, wherein the axial bearings are ball bearings.

12. The coaxial valve in accordance with claim 4, wherein the rotor is housed inside of the stator along with at least two radial anti-friction ball bearings, and is installed so as to be pivotable.

13. The coaxial valve in accordance with claim 2, wherein the drive motor is an electric motor.

14. The coaxial valve in accordance with claim 2, wherein the drive casing is installed on two axial bearings inside of the valve box.

15. The coaxial valve according to claim 14, wherein each of the two axial bearings, at respective axial outer support rings, is provided with a spherical, convex outer surface designed to correspond with an opposing concave inner surface for support inside of the valve box, and wherein the corresponding spherical concave and convex surfaces are also located at a center line of the valve box at a central axis of a ball central point.

16. The coaxial valve in accordance with claim 15, wherein the shutoff mechanism features a first part, which is provided with a circular, spherical concave surface pointing towards the valve casing in which one surface belonging to the first part of the shutoff mechanism is installed in such a manner that it is rotatable, so that both the first part and a second part are axially connected but can be moved alongside the surfaces relative to one another, and wherein, at the same time, the ball central point of the surfaces of the shutoff mechanism aligns with the ball central point of the shell-shaped surfaces and respective axial bearings.

17. The coaxial valve in accordance with claim 16, wherein the shutoff mechanism at its second part is provided with a circular step, which together with an adjacent edge of the valve casing, which is restricted by the front side of the rim of the outlet port, functions to create a seal when the valve is closed.

18. The coaxial valve in accordance with claim 3, wherein the drive motor is an electric motor.

19. The coaxial valve in accordance with claim 3, wherein the drive casing is installed on two axial bearings inside of the valve box.

20. The coaxial valve in accordance with claim 4, wherein the drive casing is installed on two axial bearings inside of the valve box.

* * * * *